US010913690B2

(12) United States Patent
Hammond

(10) Patent No.: US 10,913,690 B2
(45) Date of Patent: Feb. 9, 2021

(54) METHOD AND COMPOSITION

(71) Applicant: CCm Technologies Limited, Begbroke (GB)

(72) Inventor: Peter Hammond, Hailey (GB)

(73) Assignee: CCm Technologies Limited, Begbroke (GB)

(*) Notice: Subject to any disclaimer, the term of this patent is extended or adjusted under 35 U.S.C. 154(b) by 0 days.

(21) Appl. No.: 16/476,421

(22) PCT Filed: Jan. 4, 2018

(86) PCT No.: PCT/GB2018/050011
§ 371 (c)(1),
(2) Date: Jul. 8, 2019

(87) PCT Pub. No.: WO2018/127694
PCT Pub. Date: Jul. 12, 2018

(65) Prior Publication Data
US 2020/0024204 A1 Jan. 23, 2020

(30) Foreign Application Priority Data
Jan. 9, 2017 (GB) .................................. 1700337.7

(51) Int. Cl.
| C05C 3/00 | (2006.01) |
| C05B 17/00 | (2006.01) |
| C05C 11/00 | (2006.01) |
| C05F 5/00 | (2006.01) |
| C05F 9/04 | (2006.01) |
| C05G 5/12 | (2020.01) |
| C05C 5/00 | (2006.01) |
| C05F 17/00 | (2020.01) |

(52) U.S. Cl.
CPC ................ *C05C 3/00* (2013.01); *C05B 17/00* (2013.01); *C05C 5/00* (2013.01); *C05C 11/00* (2013.01); *C05F 5/00* (2013.01); *C05F 9/04* (2013.01); *C05F 17/00* (2013.01); *C05G 5/12* (2020.02)

(58) Field of Classification Search
None
See application file for complete search history.

(56) References Cited

U.S. PATENT DOCUMENTS

| 4,848,026 A * | 7/1989 | Dunn-Coleman | C05F 11/00 47/1.1 |
| 5,674,806 A * | 10/1997 | Adamoli, Jr. | C05D 9/00 504/358 |
| 9,555,361 B2 * | 1/2017 | Hammond | B01D 53/62 |
| 2014/0199743 A1 * | 7/2014 | Hughes | C05F 17/10 435/168 |
| 2016/0369121 A1 * | 12/2016 | Lapidot | A01C 1/06 |
| 2017/0022522 A1 * | 1/2017 | De Lima Vasconcellos | B09B 3/00 |
| 2017/0088478 A1 * | 3/2017 | Suggitt | C05F 5/002 |
| 2018/0079693 A1 | 3/2018 | Tischmacher | |
| 2020/0061541 A1 * | 2/2020 | Herron | B01D 61/025 |

FOREIGN PATENT DOCUMENTS

| GB | 2449165 | 11/2008 |
| GB | 2505437 | 3/2014 |
| GB | 2505438 | 3/2014 |
| GB | 2507397 | 4/2014 |
| GB | 2507398 | 4/2014 |
| GB | 1700337.7 | 7/2017 |
| GB | 2547324 | 8/2017 |
| GB | 1800113.1 | 7/2018 |
| WO | WO-2014/033456 | 3/2014 |
| WO | WO 2014/033456 | 3/2014 |
| WO | WO-2014/033458 | 3/2014 |
| WO | WO 2014/033458 | 3/2014 |
| WO | WO 2014/078671 | 5/2014 |
| WO | WO-2014/078671 | 5/2014 |
| WO | WO-2016/166010 | 10/2016 |
| WO | WO 2016/166010 | 10/2016 |
| WO | WO-2017/129941 | 8/2017 |
| WO | WO 2017/129941 | 8/2017 |
| WO | PCT/GB2018/050011 | 3/2018 |

OTHER PUBLICATIONS

U.S. Appl. No. 62/423,666, filed Nov. 17, 2016 (corresponding to US 2020/0061541 to Herron et al).*
International Search Report and Written Opinion issued on International Patent Application No. PCT/GB2018/050011, dated Mar. 15, 2018.
Search Report issued on UK Patent Application No. GB1700337.7, dated Jul. 3, 2017.
Search Report issued on UK Patent Application No. GB1800113.1, dated Jul. 3, 2018.

* cited by examiner

*Primary Examiner* — Wayne A Langel
(74) *Attorney, Agent, or Firm* — Howson & Howson LLP

(57) ABSTRACT

A method of producing a fertiliser composition, the method comprising:
(a) providing a composition comprising an amino compound;
(b) contacting the composition provided in step (a) with a composition comprising carbon dioxide; and
(c) adding a composition comprising cellulosic fibres to the mixture obtained in step (b).

14 Claims, No Drawings

METHOD AND COMPOSITION

CROSS-REFERENCE TO RELATED APPLICATIONS

This is a National Stage Entry under 35 U.S.C. 371 of International Patent Application No. PCT/GB2018/050011, filed Jan. 4, 2018, which claims priority to UK Patent Application No. GB1700337.7, filed Jan. 9, 2017. These applications are incorporated by reference herein.

The present invention relates to a method of preparing a fertiliser, to a fertiliser composition prepared by the method and to uses relating thereto. In particular the present invention seeks to provide a fertiliser composition that is prepared from one or more waste products.

As the world's population grows there is an ever increasing need to maximise resources, reduce waste and recycle as much as possible. In particular it is essential to reduce waste that is sent to landfill and to reduce emissions of carbon dioxide. Furthermore there is a need to maximise crop yield and thus the provision of safe and effective fertilisers is also a necessity.

According to a first aspect of the present invention there is provided a method of producing a fertiliser composition, the method comprising:
(a) providing a composition comprising an amino compound;
(b) contacting the composition provided in step (a) with a composition comprising carbon dioxide; and
(c) adding a composition comprising cellulosic fibres to the mixture obtained in step (b).

Step (a) of the method of the present invention involves providing a composition comprising an amino compound. Any suitable amino compound may be included.

In some embodiments the composition may comprise a waste material containing an amino compound.

In preferred embodiments the composition used in step (a) comprises ammonia. This may be provided directly as ammonia or a source of ammonia may be provided such as a compound which releases ammonia or is converted to ammonia.

Any suitable source of ammonia may be used. In some embodiments the ammonia may be provided as a gas. Suitably the ammonia provided is anhydrous ammonia.

In some embodiments a solution of ammonia may be used. In some embodiments a solid ammonium salt may be used, for example solid ammonium hydroxide may be used.

In some embodiments the composition comprising ammonia or a source thereof comprises a waste stream from an industrial process.

In some preferred embodiments the composition provided in step (a) is an aqueous composition.

In some embodiments the composition comprising an amino compound provided in step (a) comprises an anaerobic digestate.

As the skilled person will appreciate an anaerobic digestate is the material left following anaerobic digestion of a biodegradable feedstock. In some preferred embodiments the digestate is a methanogenic digestate.

Suitably the anaerobic digestate is provided as an aqueous composition, typically in the form of a sludge or slurry.

The anaerobic digestate may be obtained from the anaerobic digestion of any suitable material, for example grass silage, chicken litter, cattle slurry, wholecrop rye, energy beet, potato, wheat straw, chicken manure, cattle manure with straw, pig manure, food waste, food processing waste and sewage sludge.

Typically the anaerobic digestate is obtained from the anaerobic digestion of food waste or from the anaerobic digestion of farm slurry, for example pig or cow manure or chicken waste.

In some preferred embodiments the composition provided in step (a) includes a source of ammonia and an anaerobic digestate.

In some embodiments gaseous ammonia may be pumped through an anaerobic digestate composition.

In some embodiments an aqueous ammonia solution may be admixed with the anaerobic digestate.

In some embodiments solid ammonium hydroxide may be admixed with the anaerobic digestate.

In some preferred embodiments ammonia gas (preferably anhydrous ammonia gas) is pumped through the anaerobic digestate.

In preferred embodiments the composition provided in step (a) comprises an anaerobic digestate and from 10 to 60, preferably 20 to 50, more preferably 30 to 40 wt % ammonia.

Step (b) of the method of the present invention involves contacting the mixture provided in step (a) with a composition comprising carbon dioxide. The composition comprising carbon dioxide may consist essentially of carbon dioxide and/or it may comprise a mixture of carbon dioxide and one or more further components.

In some embodiments the carbon dioxide may be provided in solid form.

Preferably step (b) involves contacting the composition provided in step (a) with a composition comprising carbon dioxide wherein the composition is gaseous form. The composition may comprise neat carbon dioxide gas and/or it may comprise a gaseous mixture of carbon dioxide and one or more further gases.

In some embodiments step (b) involves contacting the composition provided in step (a) with neat carbon dioxide gas.

In some embodiments step (b) involves contacting the mixture obtained in step (a) with the exhaust gas from combustion, for example the combustion of fossil fuel. For example step (b) may involve contacting the flue gases from a power station with the composition provided in step (a).

The use of flue gases to provide the carbon dioxide is highly beneficial because the $SO_x$ and $NO_x$ gases present in the flue gas mixture may also dissolve in the composition and provide additional nutrients in the final fertiliser composition in the form of sulphates and nitrates.

In some especially preferred embodiments the source of carbon dioxide is biogas and step (b) involves contacting the composition provided in step (a) with biogas.

Biogas describes the mixture of methane and carbon dioxide that is obtained during anaerobic digestion. It may also comprise other gases in minor amounts, for example hydrogen sulphide. The exact levels of carbon dioxide and methane present in biogas depends on the mixture that has been digested and the digestion conditions. Typically biogas comprises from 20 to 80 vol % carbon dioxide, for example 30 to 70 vol %. In some embodiments biogas comprises from 40 to 45 vol % carbon dioxide and 55 to 60 vol % methane.

In some embodiments the composition comprising carbon dioxide may comprise the exhaust gases from the combustion of biogas, or of methane recovered from biogas.

One particular advantage of the method of the present invention is that it can use both the digestate and the biogas produced during anaerobic digestion.

In some preferred embodiments in which the composition comprising carbon dioxide comprises the exhaust gas from the combustion of fossil fuel and/or biogas, the hot gas mixture may be first contacted with a heat exchanger to capture heat energy from said gases.

During step (b) the carbon dioxide which is contacted with the composition provided in step (a) is suitably retained within and forms part of a new composition. Thus step (b) suitably removes carbon dioxide from the source of carbon dioxide that it is contacted with. Thus in some embodiments step (b) may involve capturing carbon dioxide from an exhaust gas produced by combustion, for example of fossil fuel.

In some preferred embodiments step (b) involves removing carbon dioxide from biogas. The resulting biogas thus has an increased relative concentration of methane and will therefore burn more easily. Thus the present invention may provide a method of enriching biogas.

In step (b) carbon dioxide is suitably contacted with the composition provided in step (a) for a time sufficient to ensure that at least 50% of the ammonia molecules present in the composition form an interaction with the carbon dioxide, preferably to ensure that at least 70%, more preferably at least 90%, preferably at least 95% and most preferably substantially all of the all of the ammonia molecules form an interaction with the carbon dioxide. Without being bound by theory it is believed that ammonium carbamates and bicarbonates are initially formed. This is then converted to ammonium carbonate. An ion exchange reaction then typically follows to yield ammonium nitrate and calcium carbonate.

The reaction of carbon dioxide with ammonia that occurs in step (b) is an exothermic reaction. Heat from this reaction may be captured. It may suitably be reused in the process.

In step (b) heat from the source of carbon dioxide and exothermic heat of reaction may be captured.

Although hot gases and an exothermic reaction are involved in step (b) preferably no external source of heat is supplied to the system.

Suitably the composition of the mixture in step (b) remains at a temperature of less than 100° C., preferably less than 80° C., suitably less than 60° C., preferably less than 50° C., suitably less than 40° C., for example less than 30° C. throughout the contact with the composition comprising carbon dioxide.

Step (c) of the method of the present invention involves adding a composition comprising cellulosic fibres to the mixture obtained in step (b).

Any suitable source of cellulose fibres may be used.

Suitable cellulosic fibres include natural cellulosic fibres and semi-synthetic or processed cellulosic fibres.

The cellulosic fibres may comprise natural fibres and/or synthetic fibres and/or semi-synthetic fibres, for example regenerated cellulose products. Suitable synthetic fibres include polyamides, polyesters and polyacrylics. Preferably the composition used in step (c) comprises natural fibres.

Suitable natural cellulosic fibres for use herein include cotton, hemp, flax, silk, jute, kenaf, ramie, sisal, kapok, agave, rattan, soy bean, vine, banana, coir, stalk fibres and mixtures thereof.

In some preferred embodiments the composition added in step (c) comprises a waste product or a by-product from agriculture. Such cellulosic fibres would otherwise have little or no value in other applications. Suitable waste products or by-products may be the stems, leaves, chaff or husks of crops, for example cereals or rapeseed. In some preferred embodiments the cellulosic fibres comprise straw or wood pulp.

In some embodiments the cellulosic fibres may comprise wood pulp, for example the material sold under the trade mark TENSEL.

In some embodiments the cellulosic fibres may comprise the waste directly obtained from pulp mills, for example pine pulp.

In some embodiments the cellulosic fibres may comprise a straw material obtained from cereals, for example wheat, rye or barley.

In preferred embodiments the composition added in step (c) comprises a waste material.

In some embodiments step (c) may involve adding decomposing organic matter to the material obtained in step (b).

In some preferred embodiments the composition comprising cellulosic fibres used in step (c) comprises partially decomposed organic matter containing cellulosic fibres.

Suitable sources of partially decomposed organic matter include compost or composting matter.

Compost is typically made up of organic material such as leaves, plant waste and food waste which has been decomposed under wet and aerobic conditions.

Thus in some preferred embodiments step (c) may involve adding a compost material comprising cellulosic fibres to the mixture obtained in step (b).

In some embodiments the composition added in step (c) may comprise an anaerobic digestate admixed with cellulosic fibres.

This may be provided alternatively or additionally to an anaerobic digestate provided in step (a).

For example the present invention may use the anaerobic digestate from animal waste wherein the animal waste is not separated from organic matter admixed therewith prior to digestion. For example sawdust or silage which is mixed with animal waste may be added to an anaerobic digester. The animal manure may be digested under anaerobic conditions but the cellulose or other organic matter present in the sawdust or silage may not be fully digested.

However the resultant mixture comprising an anaerobic digestate and partially decomposed organic matter including cellulosic fibres could be useful in step (c).

In embodiments in which an anaerobic digestate comprising cellulosic fibres is added in step (c), the digestate is preferably dried before adding to the mixture in step (b). It may be suitably be dried using heat captured from the exhaust gas of combustion (for example of fossil fuel or biogas) which provides the composition comprising carbon dioxide used in step (b) and/or during the exothermic reaction that occurs in step (b).

Compost and/or an anaerobic digestate may be added in step (c). However in preferred embodiments once this material has been admixed with the composition obtained in step (b) further composting or digestion steps are not carried out.

The method of the present invention involves providing a composition comprising an amino compound, contacting this composition with carbon dioxide, and then adding cellulosic fibres to the resultant mixture to provide a fertiliser composition.

In some embodiments the method of the present invention may involve the addition of one or more further components. Preferably the one or more further components provides a further source of one or more nutrients.

The one or more further components may be added before, after or during step (a); and/or before, during or after step (b); and/or before, during or after step (c).

In preferred embodiments the one or more further components comprises a waste material.

In some embodiments the method of the present invention further involves adding a source of nitrate ion.

The source of nitrate may be added at any stage.

The source of nitrate may be added before, after or during step (a); and/or before, during or after step (b); and/or before, during or after step (c).

Suitably the source of nitrate ion is a water soluble nitrate salt. Suitable nitrate salts include alkali metal, alkaline earth metal and ammonium salts.

A preferred source of nitrate ions is calcium nitrate.

The source of nitrate ion may be provided as a solid or a liquid.

In some embodiments the source of nitrate may comprise a waste material.

For example, in some embodiments the source of nitrate may comprise a waste stream from the ODDA/nitrophosphate process. Such a waste stream will also comprise phosphate residues thus providing a source of phosphorous in the fertiliser composition obtained by the method of the invention.

In some embodiments the source of nitrate may comprise waste from the scrubbing of combustion exhausts with nitric acid.

In preferred embodiments the source of nitrate ion is preferably added during step (a).

Thus step (a) suitably involves providing a composition comprising an amino compound and a source of nitrate.

Suitably step (a) involves providing a composition comprising ammonia and a source of nitrate ion.

In some preferred embodiments step (a) involves providing a composition comprising ammonia, a source of nitrate ions and an anaerobic digestate.

Suitably in the composition provided in step (a) of the method of the present invention the molar ratio of ammonia to nitrate salt present in the composition is from 10:1 to 1:4, preferably from 6:1 to 1:2, more preferably from 4:1 to 1:1.

When preparing the composition used in step (a) an aqueous solution of a nitrate salt may be admixed with the other compounds or a solid nitrate salt may be used, for example it may be dissolved in the digestate.

In some embodiments the present invention may involve adding a source of nitrate, for example calcium nitrate during step (b).

In some embodiments the present invention may involve providing a source of nitrate in step (a) and adding a further source of nitrate during step (b).

In some embodiments the method of the present invention further involves adding a source of phosphorus.

The source of phosphorus may be added at any stage. Suitable sources of phosphorous include the incinerated bones of animals.

The source of phosphorus may be added before, after or during step (a); and/or before, during or after step (b); and/or before, during or after step (c).

Phosphorus may be present in an anaerobic digestate provided in step (a).

A waste stream from the ODDA/nitrophosphate process may be used to provide a source of nitrate and a source of phosphorus.

Further or alternative sources of phosphorus may be added during and/or after steps (b) and/or (c).

The material obtained following step (c) of the method of the present invention can be used directly as a fertiliser composition and is highly nutritious. It contains many of the minerals that plants need for growth. It also provides a useful means of storing carbon dioxide.

This product obtained therefrom can be used directly as a fertiliser or can be further processed to provide an easier to handle form.

In some embodiments the method of the present invention involves a further step (d) of further processing the material obtained in step (c). The further processing step (d) may involve drying, pulverising and/or granulating the material. Such processing methods will be known to the person skilled in the art.

Preferably step (d) involves pelletising the material obtained in step (c). It has been advantageously found that the material obtained in step (c) is easily pelletised. The pellets do not clump together and spread as readily as leading commercially available fertiliser compositions of the prior art.

Step (b) of the method of the present invention is exothermic and the method may further involve capturing the heat obtained in step (b). This heat can be reused elsewhere in the process, for example to assist a drying step or it can be used in external processes.

Advantageously the present invention does not require high temperatures and pressure to be used. Suitably a temperature of less than 80° C. and a pressure of less than 20 bar is maintained throughout the process. At a temperature of around 80° C. a pressure of less than 2 bar, for example about 1 bar may be maintained throughout the process.

Thus the method of the first aspect of the present invention may in some embodiments be carried out at ambient pressure.

According to a second aspect of the invention there is provided a fertiliser composition obtained by the method of the first aspect.

Preferred features of the second aspect are as defined in relation to the first aspect.

Further preferred features of the first and second aspects of the present invention will now be described.

The fertiliser composition provided by the present invention suitably comprises at least 3 wt % of nitrogen, suitably at least 5 wt %, preferably at least 10 wt %, for example at least 12 wt %.

Suitably the fertiliser composition provided by the present invention comprises up to 32 wt % nitrogen, preferably up to 30 wt %.

In some embodiments the composition comprises from 12 to 16 wt % nitrogen.

In some embodiments the composition comprises from 26 to 30 wt % nitrogen.

The composition of the present invention preferably comprises one or more further plant nutrients, for example potassium or phosphate.

In some embodiments the composition comprises 2 to 15 wt % potassium.

In some embodiments the composition comprises 2 to 15 wt % phosphate.

The present invention offers significant advantages in that it uses multiple waste products to generate a useful fertiliser composition. For example the present invention can make use of an anaerobic digestate which is generally considered unsuitable for direct use as a fertiliser, as it is in the form of a sludge and thus difficult to apply. By admixing with cellulosic fibres and other components, an easier to handle solid fertiliser composition having an improved nutrient composition is provided. Furthermore the invention can make use of the biogas produced during anaerobic digestion. Thus the present invention can be put into effect at a location where anaerobic digestion is taking place.

The present inventors have tested products of the present invention and have found them to be as effective as a leading major fertiliser composition.

According to a third aspect of the present invention there is provided a method of increasing the nutrient content of a plant growing medium, the method comprising:
(a) providing a composition comprising an amino compound;
(b) contacting the composition provided in step (a) with a composition comprising carbon dioxide;
(c) adding a composition comprising cellulosic fibres to the mixture obtained in step (b); and
(d) admixing the mixture obtained in step (c) with the plant growing medium.

Steps (a), (b) and (c) of the method of the third aspect are preferred as defined in relation to the first aspect and preferred features of the first aspect apply to the third aspect.

The invention may be used to increase the nutrient content of any suitably plant growing medium.

Suitable plant growing media will be known to the person skilled in the art and include for example soil, compost, clay, coco, and peat.

Preferably the plant growing medium is soil.

The invention will now be further described with reference to the following non-limiting examples.

EXAMPLE 1

A composition of the invention was prepared on an anaerobic digestion (AD) plant according to the following procedure:

Anhydrous ammonia is dissolved in an anaerobic digestate liquor in a dilution mixer to provide an aqueous composition comprising ammonia. This composition is fed to a secondary mixer in which calcium nitrate is dissolved to form a solution A.

Hot flue gases from methane combustion in the AD plant are directed through a heat exchanger where energy is recovered to dry digestate in a digestate dryer.

Solution A is fed to a reaction mixer and flue gases are based through the solution. Carbon dioxide from the flue gases is captured, forming ammonium nitrate and calcium carbonate. The reaction time depends on the concentration of carbon dioxide in the flue gas, but can vary between 10 and 60 minutes. The reaction with carbon dioxide is exothermic, and heat from this reaction is recovered and used to dry digestate.

Dried digestate containing cellulosic fibres (and plant nutrients) is mixed with the solution. In some embodiments extra plant nutrients containing potassium, phosphate and nitrogen may be added from external sources.

The blended fertiliser is granulated, bagged and stored, ready for transport.

The invention claimed is:

1. A method of producing a fertilizer composition, the method comprising:
(a) providing a composition comprising an amino compound;
(b) contacting the composition provided in step (a) with a composition comprising carbon dioxide to obtain a mixture; and
(c) adding a composition comprising cellulosic fibers to the mixture obtained in step (b).

2. A method according to claim 1 wherein the composition provided in step (a) comprises ammonia.

3. A method according to claim 1 wherein the composition provided in step (a) comprises an anaerobic digestate.

4. A method according to claim 1 wherein the composition comprising carbon dioxide used in step (b) is a gaseous composition.

5. A method according to claim 4 wherein the composition comprising carbon dioxide comprises exhaust gases from the combustion of a fossil fuel.

6. A method according to claim 4 wherein the composition comprising carbon dioxide comprises biogas.

7. A method according to claim 1 wherein step (c) involves adding a compost material comprising cellulosic fibers to the mixture obtained in step (b).

8. A method according to claim 1 which further involves adding a source of nitrate ion.

9. A method according to claim 8 wherein step (a) involves providing a composition comprising ammonia, a source of nitrate ions and an anaerobic digestate.

10. A method according to claim 1 which further involves adding a source of phosphorus.

11. A method according to claim 1 which further involves a step (d) of further processing the material obtained in step (c).

12. A method according to claim 11 wherein step (d) involves pelletizing the material.

13. A fertilizer composition obtained by the method of claim 1.

14. A fertilizer composition according to claim 13 which comprises 10 to 30 wt % nitrogen.

* * * * *